United States Patent
Maruyama et al.

(10) Patent No.: US 9,953,046 B2
(45) Date of Patent: Apr. 24, 2018

(54) DATA DISPLAY DEVICE, DATA DISPLAY METHOD, AND PROGRAM PRODUCT

(71) Applicant: International Business Machines Corporation, Armonk, NY (US)

(72) Inventors: Daisuke Maruyama, Tokyo (JP); Takeshi Watanabe, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 990 days.

(21) Appl. No.: 13/775,479

(22) Filed: Feb. 25, 2013

(65) Prior Publication Data
US 2013/0232173 A1    Sep. 5, 2013

(30) Foreign Application Priority Data

Mar. 2, 2012   (JP) ................................ 2012-046812

(51) Int. Cl.
*G06F 17/30*  (2006.01)
*G06F 3/0482*  (2013.01)
*G06F 3/048*  (2013.01)

(52) U.S. Cl.
CPC ........ *G06F 17/30327* (2013.01); *G06F 3/048* (2013.01); *G06F 3/0482* (2013.01);
(Continued)

(58) Field of Classification Search
CPC ............. H04L 9/0836; H04L 29/08513; H04L 41/044; H04N 21/4126;
(Continued)

(56) References Cited

U.S. PATENT DOCUMENTS 5,551,022 A  *  8/1996  Tariq et al.
5,696,916 A  *  12/1997  Yamazaki et al. ............ 715/853
(Continued)

FOREIGN PATENT DOCUMENTS

CN   101330657 A   12/2008
CN   101837464 A   11/2010
(Continued)

OTHER PUBLICATIONS

Victor, B., "Visualizing Weights of Graph Edges", [online] May 10, 2011 [retrieved Mar. 12, 2012] retrieved from the Internet: <http://worrydream.com/VisualizingEdgeWeights/>.
(Continued)

*Primary Examiner* — Srirama Channavajjala
(74) *Attorney, Agent, or Firm* — Cuenot, Forsythe & Kim, LLC

(57) ABSTRACT

Displaying pieces of data includes displaying a tree structure on a display device, identifying, in response to a first node being selected from among nodes constituting the displayed tree structure, all nodes connected to the first node in a high-order direction and a low-order direction as a first node group, and identifying, in response to a second node being selected, the second node not being included in the first node group, all nodes connected to the second node in the high-order direction and the low-order direction as a second node group. The second node moves toward the first node according to an operation. A node not to be displayed is determined according to a rule and movement of the second node group. A display device is instructed to display the first node group and the second node group close to each other omitting display of the determined node.

20 Claims, 11 Drawing Sheets

(52) U.S. Cl.
CPC .. *G06F 17/30572* (2013.01); *G06F 17/30625* (2013.01); *G06F 17/30961* (2013.01)

(58) Field of Classification Search
CPC ........ H04N 2005/44539; G06F 3/0482; G06F 17/30554; G06F 17/30961; G06F 17/30625; G06F 17/30327; G06F 17/2247
USPC ............... 345/672, 678, 684, 419, 661, 676; 715/733, 764, 853–854, 770, 967, 835; 707/705, 748, 750, 805, 821, 828–829
See application file for complete search history.

(56) References Cited

U.S. PATENT DOCUMENTS

| | | | |
|---|---|---|---|
| 6,055,515 A * | 4/2000 | Consentino et al. | 705/27.1 |
| 6,633,308 B1 * | 10/2003 | Ono et al. | 715/723 |
| 9,519,677 B2 | 12/2016 | Wong et al. | |
| 2002/0118214 A1 | 8/2002 | Card et al. | |
| 2003/0018646 A1 * | 1/2003 | Ohta et al. | 707/100 |
| 2003/0085931 A1 | 5/2003 | Card et al. | |
| 2005/0273730 A1 | 12/2005 | Card et al. | |
| 2006/0045110 A1 * | 3/2006 | Miura et al. | 370/408 |
| 2007/0130314 A1 * | 6/2007 | Hibino et al. | 709/223 |
| 2009/0307625 A1 | 12/2009 | Daniels | |
| 2010/0042644 A1 | 2/2010 | Judy et al. | |
| 2010/0169831 A1 | 7/2010 | Lu | |
| 2011/0207436 A1 * | 8/2011 | van Gent et al. | 455/413 |
| 2011/0307436 A1 | 12/2011 | Cai et al. | |

FOREIGN PATENT DOCUMENTS

| | | |
|---|---|---|
| CN | 102053987 A | 5/2011 |
| CN | 104145271 A | 11/2014 |
| EP | 1217555 A2 | 6/2002 |
| GB | 2511018 A | 8/2014 |
| JP | 8255253 A | 10/1996 |
| JP | 2003114974 A | 4/2003 |
| JP | 2009037637 A | 2/2009 |
| JP | 2009245162 A | 10/2009 |
| JP | 5643462 B2 | 12/2014 |
| WO | 2013128974 A1 | 9/2013 |

OTHER PUBLICATIONS

JP Application No. 2012-046812, Search Report dated Feb. 26, 2013, 7 pgs.
WIPO Appln. PCT/JP2013/051064, IPER and Written Opinion, Sep. 12, 2014, 6 pg.

* cited by examiner

DATA DISPLAY DEVICE, DATA DISPLAY METHOD, AND PROGRAM PRODUCT

CROSS-REFERENCE TO RELATED APPLICATIONS

This application claims the benefit of Japan Application Number 2012-046812 filed on Mar. 2, 2012, which is fully incorporated herein by reference.

BACKGROUND

One technique for efficiently managing a large amount of data by a computer is to use a tree structure or a graph structure. A tree structure has a plurality of layers, and is a structure in which individual nodes are arranged such that a plurality of nodes in lower layers branch from a node serving as one element belonging to a certain layer. A graph structure is a structure composed of a pair of a finite set of nodal points and a finite set of edges (ordered pair of nodal points). Nodal points are regarded as nodes, and edges are represented by line segments connecting nodes. In the graph structure, individual nodes are arranged such that a plurality of nodes branch from one node in some cases. Thus, the graph structure can be displayed as a tree structure.

In cases where a plurality of nodes branch from a certain node, the certain node is called a parent node. The plurality of nodes are called child nodes. A node having no parent node is called a root node and is regarded as a highest-order node. A node having no child node is called a leaf node and is regarded as a lowest-order node.

A parent node has a pointer for a child node. The pointer includes information for accessing a parent node or a child node. This enables sequential scanning from a highest-order root node to a lowest-order leaf node, and thereby a target node can be searched for. When there are a plurality of child nodes, the parent node is capable of having a list of pointers for the plurality of child nodes.

An example of data which can be managed by using the above-described tree structure or graph structure is data "IT device". "IT device" includes a "PC", a "tablet terminal", a "smart phone", and so forth. A "PC" includes "main body", "display", and so forth, and "main body" includes "CPU", "memory", and so forth. Thus, a piece of data "IT device" can be represented as a root node, pieces of data "PC" and so forth can be represented as nodes in the subsequent layer, pieces of data "main body" and so forth can be represented as nodes in the subsequent layer, and pieces of data "CPU" and so forth can be represented as lowest-order nodes. Also, the piece of data "IT device" and the pieces of data "PC" and so forth can be connected by line segments, and the piece of data "PC" and the pieces of data "main body" and so forth can be connected by line segments.

FIG. 1 illustrates a case where pieces of data are managed using a tree structure or a graph structure, and the pieces of data are displayed on a screen using a tree structure. In FIG. 1, two tree structures are displayed in which each piece of data serves as a node constituting a tree structure. There is a demand for efficiently displaying many pieces of data managed using such a tree structure and efficiently accessing a target piece of data.

For example, when a user wants to perform an operation by focusing attention on two nodes, node X1 and node Y3 illustrated in FIG. 1, the user can easily perform an operation on node X1 and node Y3 if node X1 and node Y3 can be displayed as close as possible by omitting node X2, node X3, node X4, node Y1, and node Y2 between node X1 and node Y3. In a case where it is necessary to scroll the screen to display both node X1 and node Y3, the user can perform an operation without scrolling the screen if both node X1 and node Y3 can be displayed on one screen.

As a technique of enabling such display with omission, a technique has been suggested in which weighing based on a parameter such as a degree of importance is performed, a threshold is set, and paths whose value is equal to or smaller than the threshold are omitted on the basis of the weighting. In this technique, weights are assigned to edges, and only edges having a weight of a certain value or more and nodes including the edges are displayed.

Also, there has been suggested a graph display processing device including graph display means for displaying a graph in the form of a tree structure. The graph display means has a function of additionally displaying, when there is a node whose display is to be omitted, a symbol representing the existence of the node to be omitted in the subsequent stage, the symbol being displayed at the end of or near the node in the preceding stage of the node to be omitted.

BRIEF SUMMARY

A system for displaying a plurality of pieces of data by using a tree structure includes a display device and a processor coupled to the display device. The processor is programmed to initiate executable operations. The executable operations include displaying at least one tree structure in which the plurality of pieces of data serve as nodes on the display device, identifying, in response to a first node being selected from among the nodes constituting the displayed tree structure, all nodes connected to the first node in a high-order direction and a low-order direction as a first node group, and identifying, in response to a second node being selected, the second node not being included in the first node group, all nodes connected to the second node in the high-order direction and the low-order direction as a second node group. The executable operations further include accepting an operation of moving the second node toward the first node and moving the second node group toward the first node in accordance with the operation, determining, in accordance with a predetermined rule, a node whose display is to be omitted in accordance with movement of the second node group, and instructing the display device to display the first node group and the second node group close to each other by omitting display of the determined node.

A method includes displaying upon a display device at least one tree structure in which the plurality of pieces of data serve as nodes, identifying, in response to a first node being selected from among the nodes constituting the displayed tree structure, all nodes connected to the first node in a high-order direction and a low-order direction as a first node group, and identifying, in response to a second node being selected, the second node not being included in the first node group, all nodes connected to the second node in the high-order direction and the low-order direction as a second node group. The method further includes accepting an operation of moving the second node toward the first node and moving the second node group toward the first node in accordance with the operation, determining, using a processor and in accordance with a predetermined rule, a node whose display is to be omitted in accordance with movement of the second node group, and instructing the display device to display the first node group and the second node group close to each other by omitting display of the determined node.

A computer program product for displaying a plurality of pieces of data by using a tree structure includes a computer readable storage medium having program code stored thereon. The program code is executable by a processor to perform a method. The method includes displaying upon a display device at least one tree structure in which the plurality of pieces of data serve as nodes, identifying, using the processor and in response to a first node being selected from among the nodes constituting the displayed tree structure, all nodes connected to the first node in a high-order direction and a low-order direction as a first node group, and identifying, using the processor and in response to a second node being selected, the second node not being included in the first node group, all nodes connected to the second node in the high-order direction and the low-order direction as a second node group. The method further includes accepting, using the processor, an operation of moving the second node toward the first node and moving the second node group toward the first node in accordance with the operation, determining, using the processor and in accordance with a predetermined rule, a node whose display is to be omitted in accordance with movement of the second node group, and instructing, using the processor, the display device to display the first node group and the second node group close to each other by omitting display of the determined node.

DETAILED DESCRIPTION

Figure 1:
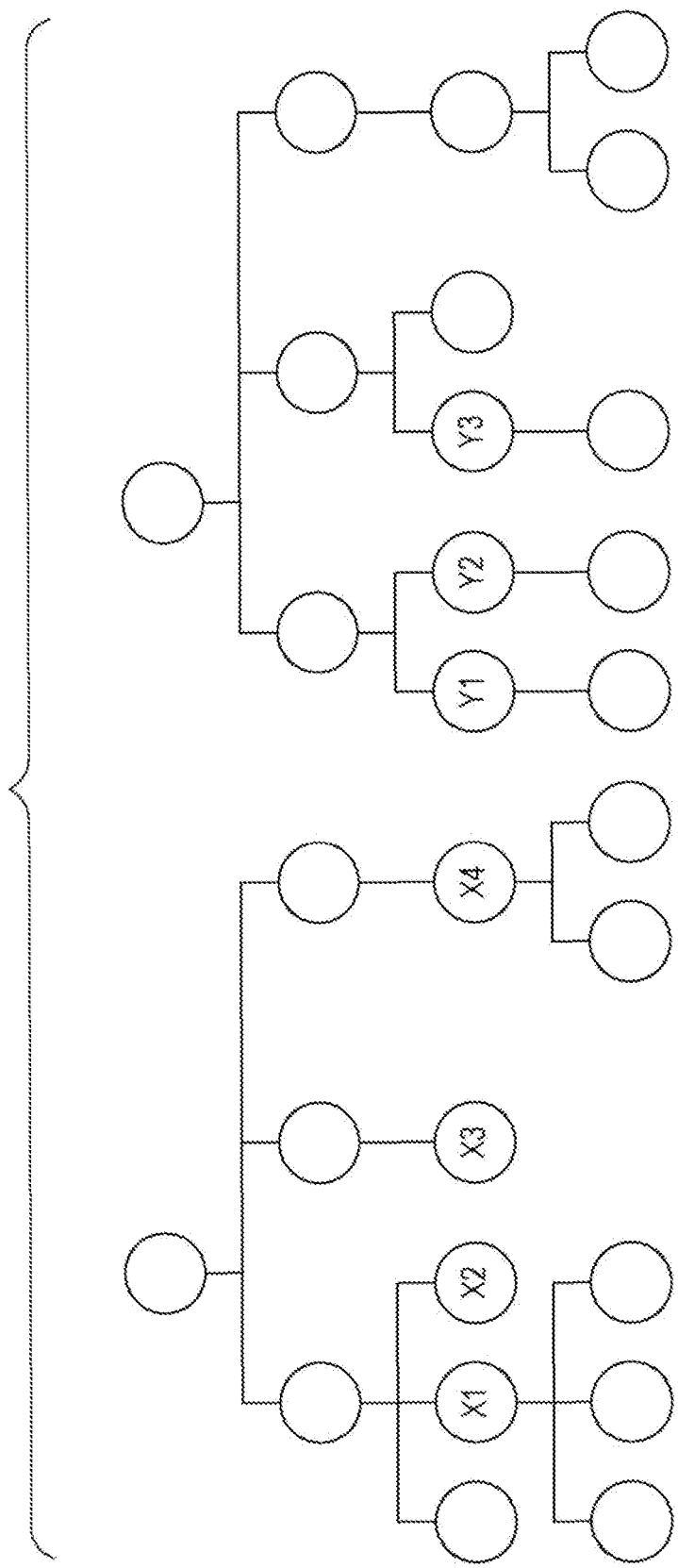
FIG. 1 is a diagram illustrating tree structures for managing a plurality of pieces of data.

One or more embodiments relate to a device, method, and program product for displaying a plurality of pieces of data by using a tree structure. More specifically, one or more embodiments relate to a data display device capable of displaying a plurality of pieces of data by using a tree structure, each piece of data serving as a node, causing certain nodes to get close to each other, and thereby displaying the nodes by omitting nodes between the certain nodes, and also relates to a display method therefor and a computer-readable program product for executing the method.

In some cases, paths are omitted on the basis of weighting using a parameter. However, omission using the parameter is limited and cannot be performed by reflecting on the intention of a user on each occasion.

In some cases, a symbol can be displayed representing omission when a node is omitted.

A list of operations may be displayed by using a context menu or the like of individual nodes, and an operation may be selected from the list so as to be executed. Such a process involves complicated operations.

Accordingly, there has been a demand for a device and method capable of displaying nodes by omitting unnecessary nodes by reflecting the intention of a user with a simple operation.

Embodiments of the present invention have been made to solve the above-described problems, and the above-described problems can be solved by providing a data display device, a data display method, and a computer-readable program product for executing the method which will be described below.

According to an embodiment of the present invention, there is provided a data display device for displaying a plurality of pieces of data by using a tree structure. The data display device includes display means for displaying at least one tree structure in which the plurality of pieces of data serve as nodes, first identifying means for identifying, in response to a first node being selected from among the nodes constituting the displayed tree structure, all nodes connected to the first node in a high-order direction and a low-order direction as a first node group, second identifying means for identifying, in response to a second node being selected, the second node not being included in the first node group, all nodes connected to the second node in the high-order direction and the low-order direction as a second node group, movement means for accepting an operation of moving the second node toward the first node and moving the second node group toward the first node in accordance with the operation, determining means for determining, in accordance with a predetermined rule, a node whose display is to be omitted in accordance with movement of the second node group, and instructing means for instructing the display means to display the first node group and the second node group close to each other by omitting display of the determined node.

A user can display two nodes close to each other only by performing an operation of selecting the two nodes and moving one of them toward the other. Thus, display of unnecessary nodes can be omitted while reflecting the intention of the user with a simple operation.

The rule may state that a node located at a certain distance or less from any of the nodes constituting the second node group is the node whose display is to be omitted. Also, the rule may state that a node overlapping any of the nodes constituting the second node group is the node whose display is to be omitted.

In addition, the rule may state that a node not located between the first node group and the second node group is the node whose display is to be omitted. The two node groups can be displayed in parallel, and display of the other nodes can be omitted. Thus, an operation can be performed on a target node more efficiently.

The display means may display, when displaying the tree structure, content of the individual pieces of data corresponding to the individual nodes by reducing or omitting the content. Thus, when displaying the first node group and the second node group close to each other in response to an instruction provided from the instructing means, the display means may display the first node group and the second node group in an enlarged manner to display the content in an enlarged manner or to display the whole content. Such display in an enlarged manner can be gradually performed as the second node group becomes closer to the first node. When many nodes are displayed on one screen, characters, figures, or the like expressing the content of data may be too small, or some characters are omitted, and thus it is impossible to recognize the data. However, such display in an enlarged manner or display of the whole content enables a user to recognize characters and figures in the data.

Each of the nodes may be associated with a weight value, and the rule may state that a node located at a certain distance or less from any of the nodes constituting the second node group and associated with the weight value which is equal to or smaller than a threshold, or a node overlapping any of the nodes constituting the second node group and associated with the weight value which is equal to or smaller than the threshold is the node whose display is to be omitted.

The weight value may be given in accordance with a degree of importance determined based on a time when the piece of data was created, the number of users who have used the piece of data, how often the piece of data is updated, and how often the piece of data is referred to. Alternatively, a user may set a degree of importance, and a weight value corresponding thereto may be given. Accordingly, a node with a high degree of importance can be kept displayed without being omitted.

The instructing means may refer to node display information set by a user, and instruct the display means to hide a node whose display is to be omitted among the nodes included in the first node group and the second node group. Accordingly, a demand for referring to only data at the vicinity of a target node can be satisfied.

One or more embodiments of the present invention can provide, in addition to the above-described data display device, a data display method executed by the data display device, and a computer-readable program product for executing the method. The program product is stored in a server device, database, or the like connected to a network, and can be provided in response to a download request. Alternatively, the program product may be provided by being stored in a recording medium, such as a CD-ROM, SD card, DVD, or flash memory.

Figure 2:
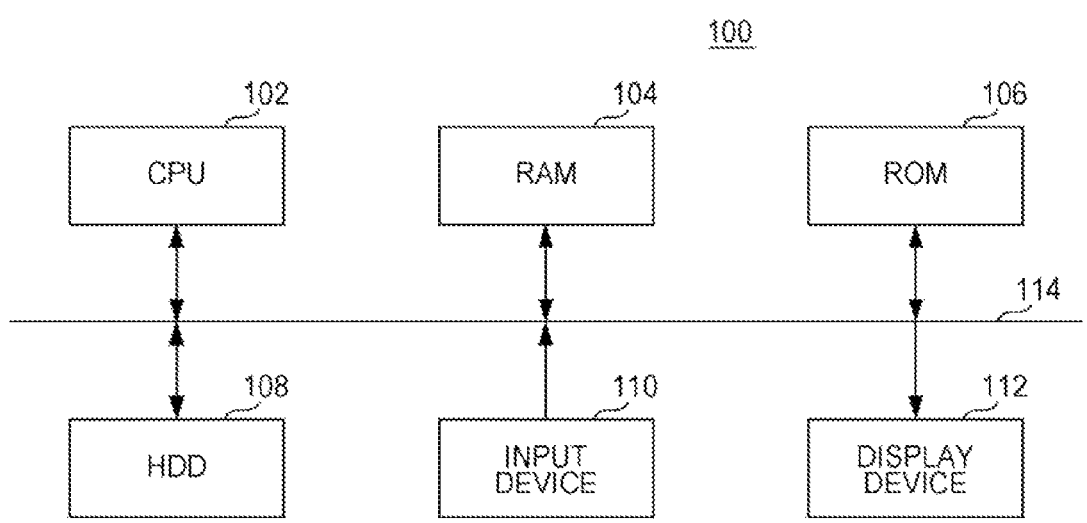
FIG. 2 is a diagram illustrating an example of a hardware configuration of a data display device according to an embodiment of the present invention.

FIG. 2 is a diagram illustrating an example of a hardware configuration of a data display device according to the present invention. The data display device 100 may be, for example, a personal computer or a work station, and includes a central processing unit (CPU) 102, a random access memory (RAM) 104 and a read only memory (ROM) 105 used as main storage devices, a hard disk drive (HDD) 108, an input device 110 including a keyboard and a mouse, and a display device 112. These devices are connected to a system bus 114, and data communication is performed via the system bus 114. The personal computer may be any of a notebook PC, a desktop PC, and a tablet PC.

As the CPU 102, for example, Core (registered trademark) or Pentium (registered trademark) by Intel Corporation, Phenom (registered trademark) or Athlon (registered trademark) by AMD Inc., or the like may be used. The RAM 104 is a storage device used by the CPU 102 to directly read data therefrom and write data thereon.

The ROM 106 stores Basic Input/Output System (BIOS), firmware, and so forth. The HDD 108 stores various types of application software, an operating system (OS), and so forth. As the OS, an OS compatible with the CPU 102, such as UNIX (registered trademark), Linux (registered trademark), Windows (registered trademark), or Mac OS (registered trademark), may be used.

The HDD 108 is capable of storing a program for managing a plurality of pieces of data using a tree structure and executing a process of displaying the plurality of pieces of data using the tree structure. The program is read out by the CPU 102 to the RAM 104. When the CPU 102 executes the program, the process described below is realized. The program can be created by using a certain program language, such as C, C++, C#, or Java (registered trademark).

The input device 110 is used to operate a graphic object, such as an icon, a task bar, or a window displayed on the screen of the display device 112, in accordance with a graphic user interface (GUI) provided by the OS, or to input characters, numerals, and so forth. The input device 110 is also used to press a command button displayed on the screen of the display device 112. With pressing of the button, a process can be started, suspended, or ended.

The display device 112 may be, for example, a liquid crystal display, and may have a touch panel mounted thereon. When the display device 112 has a touch panel mounted thereon, the above-described operations or inputting of characters can be performed by touching the screen, and thus the input device 110 is not necessary.

Additionally, a communication interface for connecting to a network, a digital versatile disc (DVD) drive, an SD card slot, and so forth may be provided if necessary. This system may include a transmitter/receiver to realize a wireless local area network (LAN) function or a Bluetooth (registered trademark) function.

Figure 3:
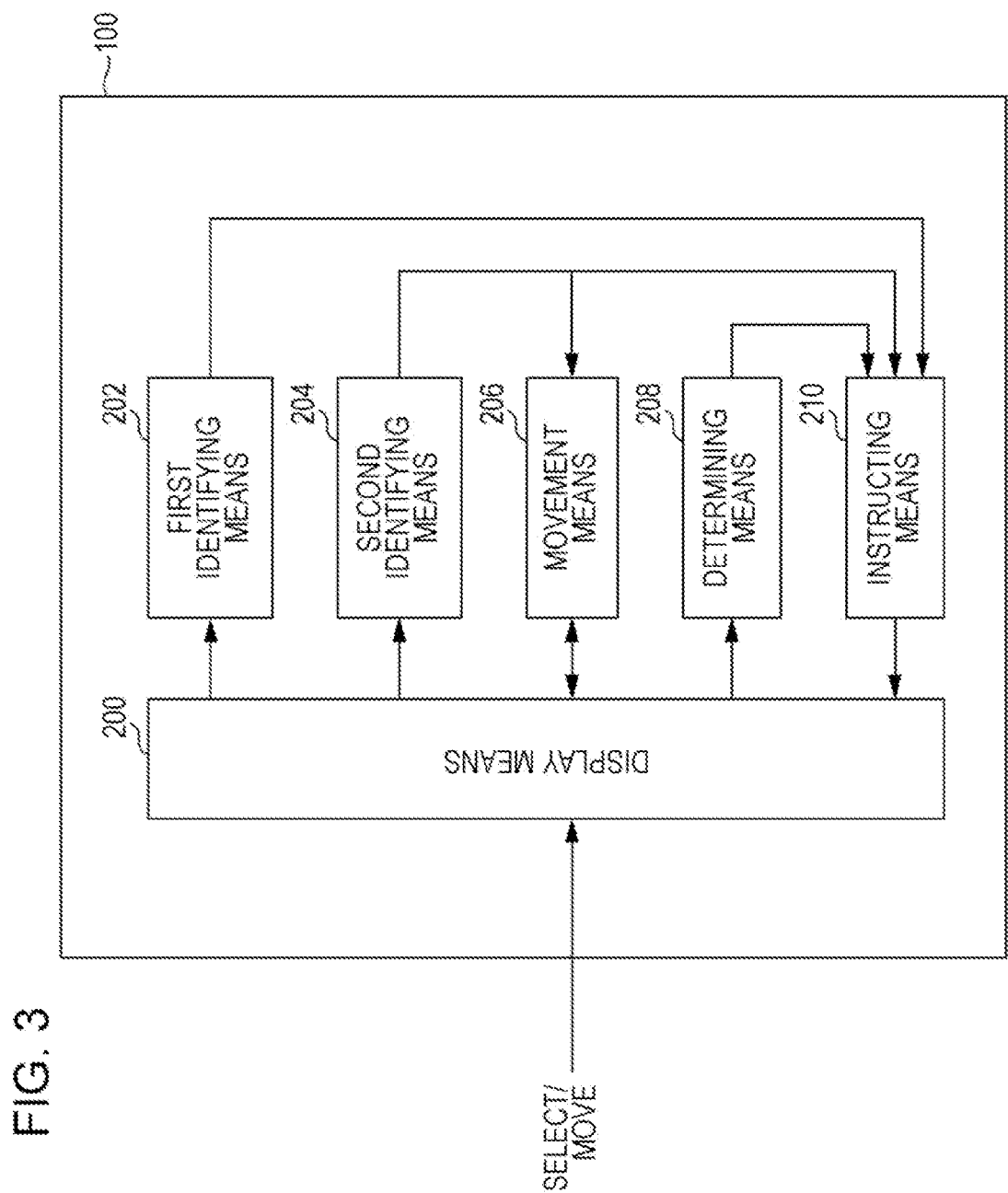
FIG. 3 is a functional block diagram illustrating an embodiment of the data display device according to an embodiment of the present invention.

FIG. 3 is a functional block diagram of the data display device 100 illustrated in FIG. 2. The data display device 100 includes the CPU 102, the RAM 104, and the HDD 108, as described above. The HDD 108 stores a program for executing a process of displaying data using the above-described tree structure. When the CPU 102 reads out the program to the RAM 104 and executes the program, the data display device 100 is capable of functioning as the following means.

The data display device 100 includes display means 200, first identifying means 202, second identifying means 204, movement means 206, determining means 208, and instructing means 210.

Figure 4:
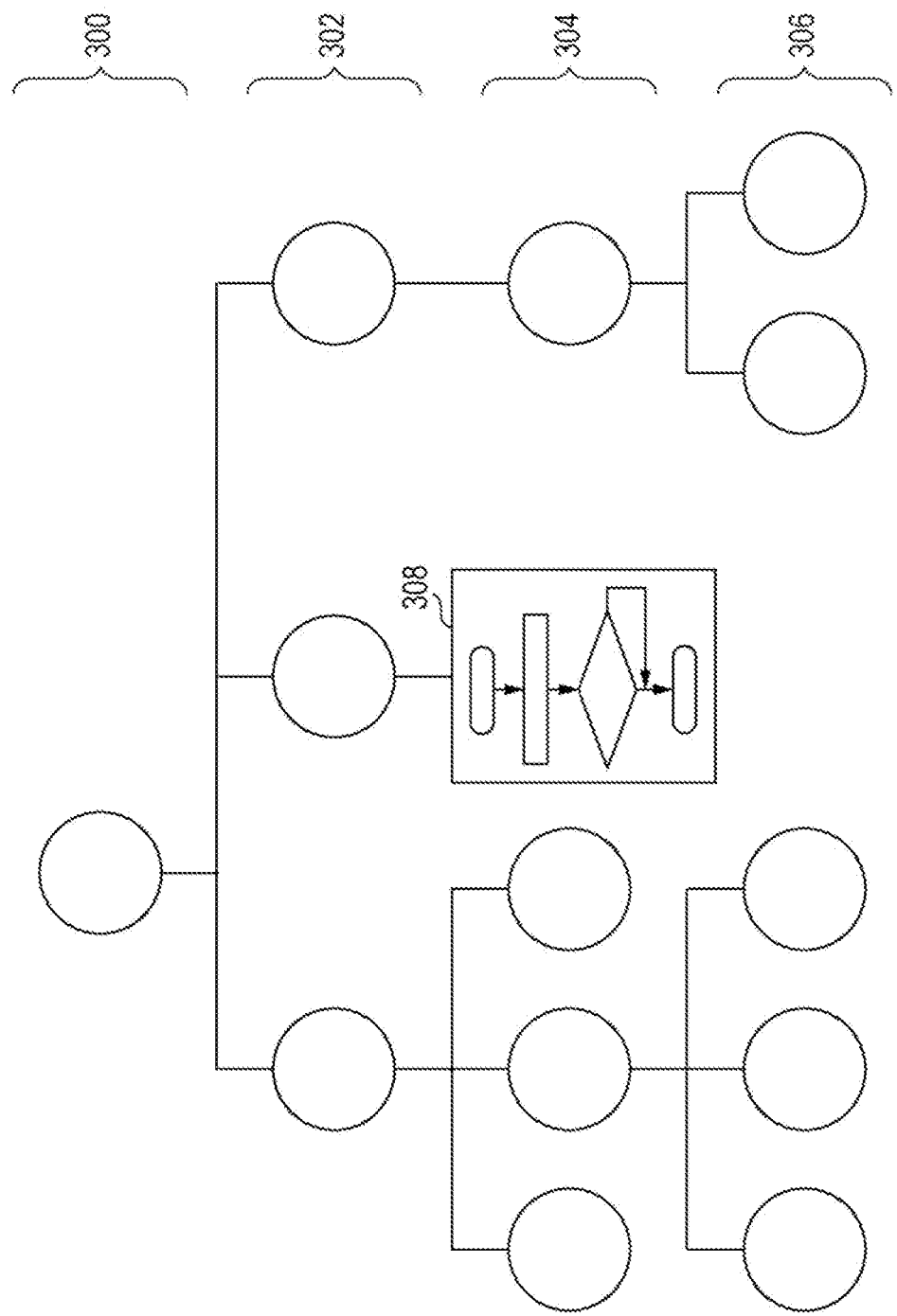
FIG. 4 is a diagram illustrating a state where display means displays a tree structure.

The display means 200 displays at least one tree structure, in which each piece of data serves as a node constituting the tree structure. As illustrated in FIG. 4, the tree structure has one root node 300, nodes 302 which branch from the root node 300, nodes 304 which branch from the nodes 302 or which are connected to the nodes 302, and nodes 306 which branch from the nodes 304.

The tree structure forms the hierarchical structure illustrated in FIG. 4. The root node 300 is a highest-order node, the nodes 302 are second-highest-order nodes, and the nodes 304 and 306 follow. Some of the nodes 304 and all of the nodes 306 have no nodes connected thereto in a low-order direction, and thus are lowest-order nodes and leaf nodes. These nodes have a parent-child relationship. For example, as for the relationship between the nodes 302 and the nodes 304, the nodes 302 are parent nodes, and the nodes 304 are child nodes.

The display means 200 is capable of displaying a node in the form of a reduced image (for example, thumbnail) representing the content of the corresponding piece of data (node 308 in the nodes 304 illustrated in FIG. 4). In a case where the node 308 has a flowchart as data content, the flowchart can be displayed in the form of a reduced image. As illustrated in FIG. 4, the entire tree structure is displayed on one screen. Thus, if the tree structure has many nodes, the reduced images corresponding thereto are small, and characters written in the flowchart are difficult to read. When a user wants to know the content of data, the user may double-click the reduced image to display the data in a normal image size, and is thereby able to read the characters in the data.

Referring back to FIG. 3, in response to a node (first node) among the nodes constituting the tree structure displayed on the display means 200 being selected, the first identifying means 202 identifies all the serial nodes connected to the first node in the high-order direction and low-order direction, as one node group (first node group). Accordingly, the serial nodes connected to the first node can be left, and the pieces of data corresponding to the serial nodes can be referred to if necessary.

For example, in the case of selecting "main body" as a piece of data to be referred to, if only "main body" is displayed, the user does not recognize the pieces of data related to "main body". If serial nodes are identified as a node group, higher-order nodes such as "PC" and "IT device" are displayed, and accordingly the user can recognize "main body" is related to these pieces of data.

Figure 5:
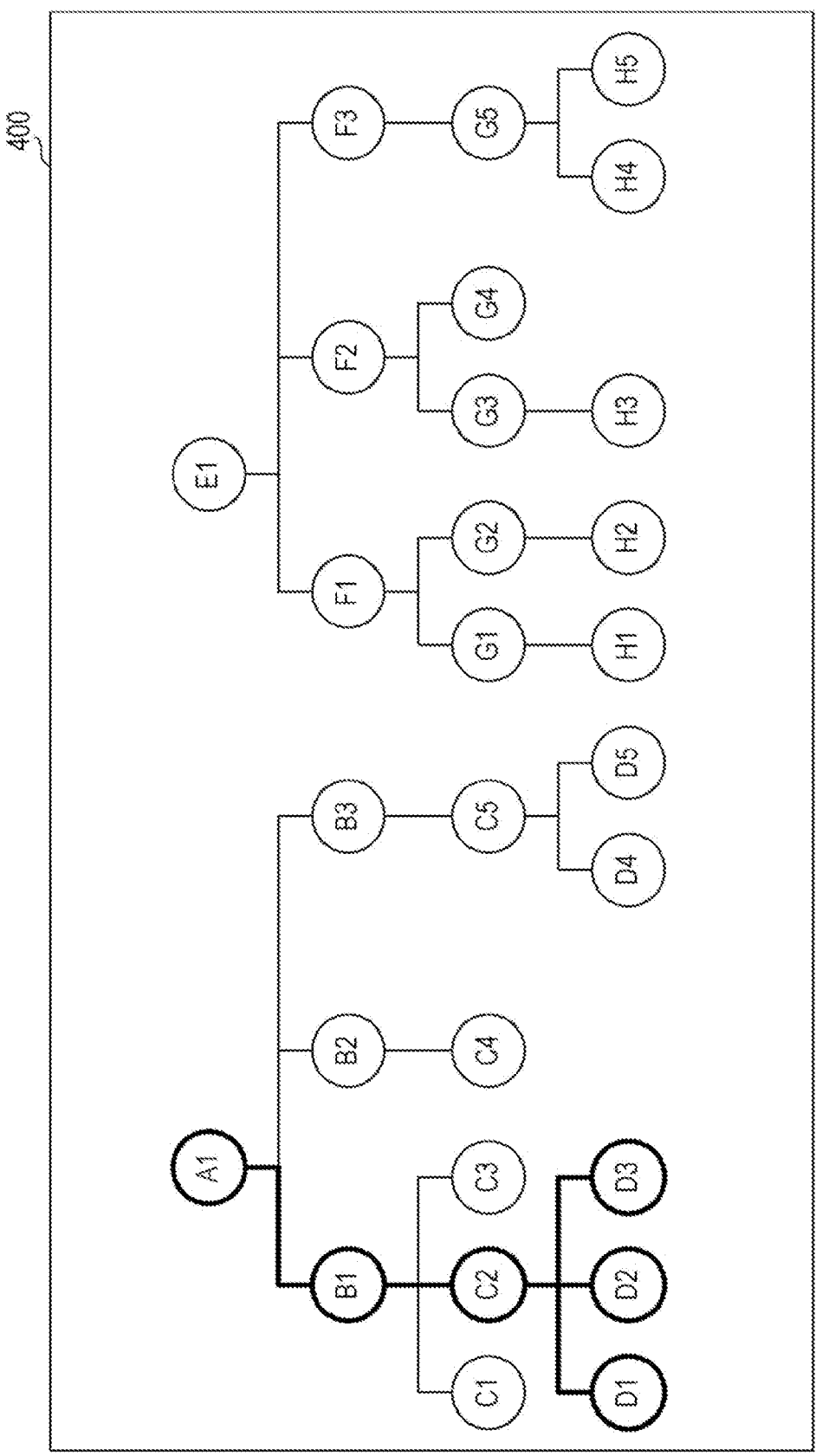
FIG. 5 is a diagram illustrating a state where a first node group is identified by first identifying means.

FIG. 5 illustrates the first node group identified by the first identifying means 202 displayed on a screen 400. The user selects a node to be referred to by using an input device such as a mouse. In one example, the user puts a pointer on an icon or reduced image representing node C2 illustrated in FIG. 5 by using the mouse, and clicks the icon or reduced image to select node C2.

In response to the selection, the first identifying means 202 identifies the serial nodes connected to node C2 in the high-order direction and low-order direction. Each node has a pointer, and the pointer includes information for accessing a lower-order node. If the node has a plurality of child nodes, the node can hold a list of pointers for the child nodes.

The first identifying means 202 refers to one or more pointers held by node C2, searches for one or more nodes which have a pointer for node C2, and thereby identifies node B1 connected to node C2 in the high-order direction and nodes D1, D2, and D3 connected to node C2 in the low-order direction. Also, the first identifying means 202 refers to one or more pointers held by nodes D1, D2, and D3, searches for one or more nodes which have a pointer for node B1, and thereby identifies only node A1 connected to node B1 in the high-order direction.

Search for one or more nodes connected to the selected first node in the high-order direction can be performed by searching for a parent node of the first node. Every node has only one parent node when the node has a higher-order node. Thus, only one node is detected through the search.

The first identifying means 202 searches for one or more nodes which have a pointer for node A1. However, no nodes exist above node A1, and thus the first identifying means 202 eventually identifies nodes A1, B1, C2, D1, D2, and D3 as a first node group. In FIG. 5, the first node group identified in this manner is displayed with a different thickness of lines of frames so as to be distinguishable from the other nodes, such as nodes B2, B3, and C1. Also, the lines connecting these nodes are displayed in a distinguishable manner. Such a manner of display is merely an example. Alternatively, the nodes may be displayed in a distinguishable manner by changing the color inside the frames or the shape of the frames.

Referring back to FIG. 3, in response to another node (second node) different from the identified first node group being selected, the second identifying means 204 identifies all the nodes connected to the second node in the high-order direction and low-order direction, as one node group (second node group).

Figure 6:
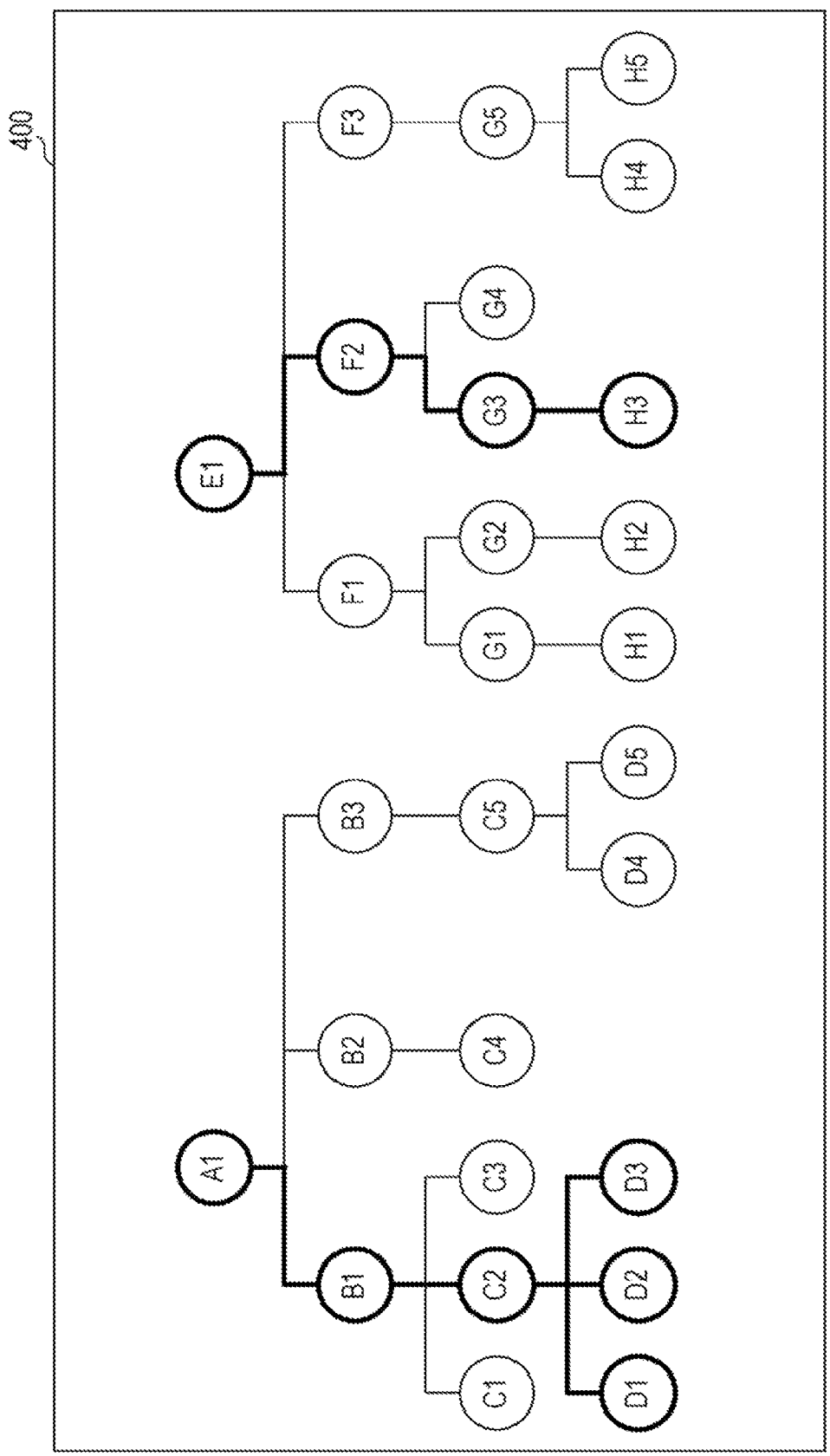
FIG. 6 is a diagram illustrating a state where a second node group is identified by second identifying means.

FIG. 6 illustrates the second node group identified by the second identifying means 204 displayed on the screen 400. The user selects a node to be referred to by using an input device such as a mouse. In one example, the user puts a pointer on an icon or reduced image representing node G3 illustrated in FIG. 6 by using the mouse, and clicks the icon or reduced image to select node G3. In FIG. 6, the first node group has already been identified.

The second identifying means 204 identifies the serial nodes connected to node G3 in the high-order direction and low-order direction. Specifically, as in the process performed by the first identifying means 202, the second identifying means 204 refers to one or more pointers held by node G3, searches for one or more nodes which have a pointer for node G3, and thereby identifies nodes F2 and H3 connected to node G3 in the high-order direction and low-order direction.

Also, the second identifying means 204 searches for one or more nodes which have a pointer for node F2, and thereby identifies node E1 connected to node F2 in the high-order direction. No nodes exist above node E1 and no nodes exist below node H3, and thus the second identifying means 204 identifies nodes E1, F2, G3, and H3 as the second node group. In FIG. 6, the identified second node group is illustrated with a different thickness of lines of frames so as to be distinguishable from the other nodes, such as nodes F1, G1, and G2, and the first node group. Also, the lines connecting these nodes are displayed in a distinguishable manner. As in the above-described case, the nodes may be displayed in a distinguishable manner by changing the color inside the frames or the shape of the frames.

Referring back to FIG. 3, when the user moves an icon or reduced image representing the second node toward the first node by dragging it using a mouse or the like, the movement means 206 accepts the operation and moves the identified second node group toward the first node in accordance with the operation. The movement means 206 detects, for example, the movement direction and movement speed of the pointer of the mouse, and moves icons or reduced images representing the individual nodes constituting the second node group on the basis of the movement direction and movement speed, thereby being capable of realizing movement. The movement method is not limited to this. For example, the movement means 206 may sequentially detect the position of the pointer and perform movement on the basis of the position.

As a result of moving the icons or reduced images representing the individual nodes constituting the second node group by the movement means 206, the icons or reduced images may overlap icons or reduced images representing the nodes located between the first node group and the second node group. Accordingly, in order to omit such unnecessary nodes that may overlap, the determining means 208 determines the nodes whose display is to be omitted along with the movement of the second node group, in accordance with a predetermined rule.

The determining means 208 determines the nodes whose display is to be omitted in accordance with the predetermined rule. The rule states that, for example, a node located at a certain distance (for example, 5 mm or 1 cm) or less from any of the nodes constituting the second node group is the node whose display is to be omitted. Alternatively, the rule may state that a node that overlaps any of the nodes constituting the second node group (a node located at a zero distance from any of the nodes constituting the second node group) is the node whose display is to be omitted. The instructing means 210 instructs the display means 200 to display the first node group and the second node group close to each other by omitting display of the nodes determined by the determining means 208.

Figure 7:
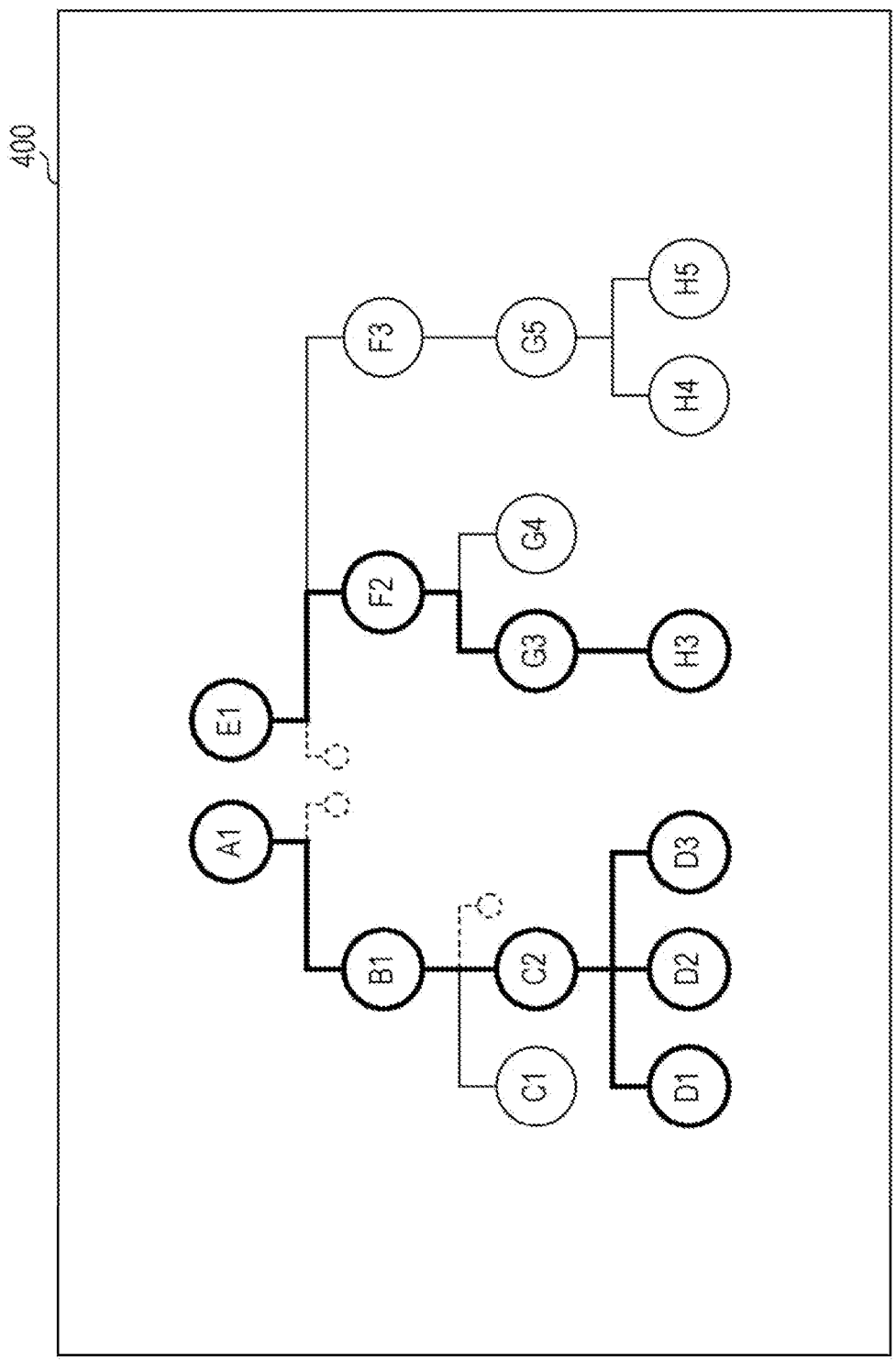
FIG. 7 is a diagram illustrating a state where the second node group is moved by movement means, the display means omits display of nodes in response to an instruction provided from instructing means, and the first node group and the second node group are displayed close to each other.

Referring to FIGS. 6 and 7, in a case where node G3 as the second node illustrated in FIG. 6 is moved toward node C2 as the first node, nodes B2, B3, C3, C4, C5, D4, D5, F1, G1, G2, H1, and H2 located between nodes A1, B1, C2, D1, D2, and D3 constituting the first node group and nodes E1, F2, G3, and H3 constituting the second node group are determined to be the nodes whose display is to be omitted by the determining means 208 when the distance to any of the nodes constituting the second node group becomes the certain distance or less, and the display thereof is omitted in response to an instruction provided by the instructing means 210 to the display means 200.

Finally, as illustrated in FIG. 7, all the nodes located between the first node group and the second node group are omitted, and the first node group and the second node group are displayed next to each other. The omitted nodes may be completely erased from the screen. Alternatively, as illustrated in FIG. 7, the omitted nodes may be unified and an omission symbol indicating that the nodes are omitted may be displayed. In FIG. 7, a small circle and part of the line connected thereto illustrated with a broken line serve as an omission symbol.

When such an omission symbol is displayed, the user can display all the omitted nodes by selecting the omission symbol using an input device such as a mouse. For example, all the omitted nodes can be displayed by placing a mouse cursor on the omission symbol and clicking the omission symbol to select it.

In this way, the user can display two nodes close to each other only by performing an operation of selecting the two nodes and moving one of them toward the other. Accordingly, display of unnecessary nodes can be omitted while reflecting the intention of the user with a simple operation.

Figure 8:
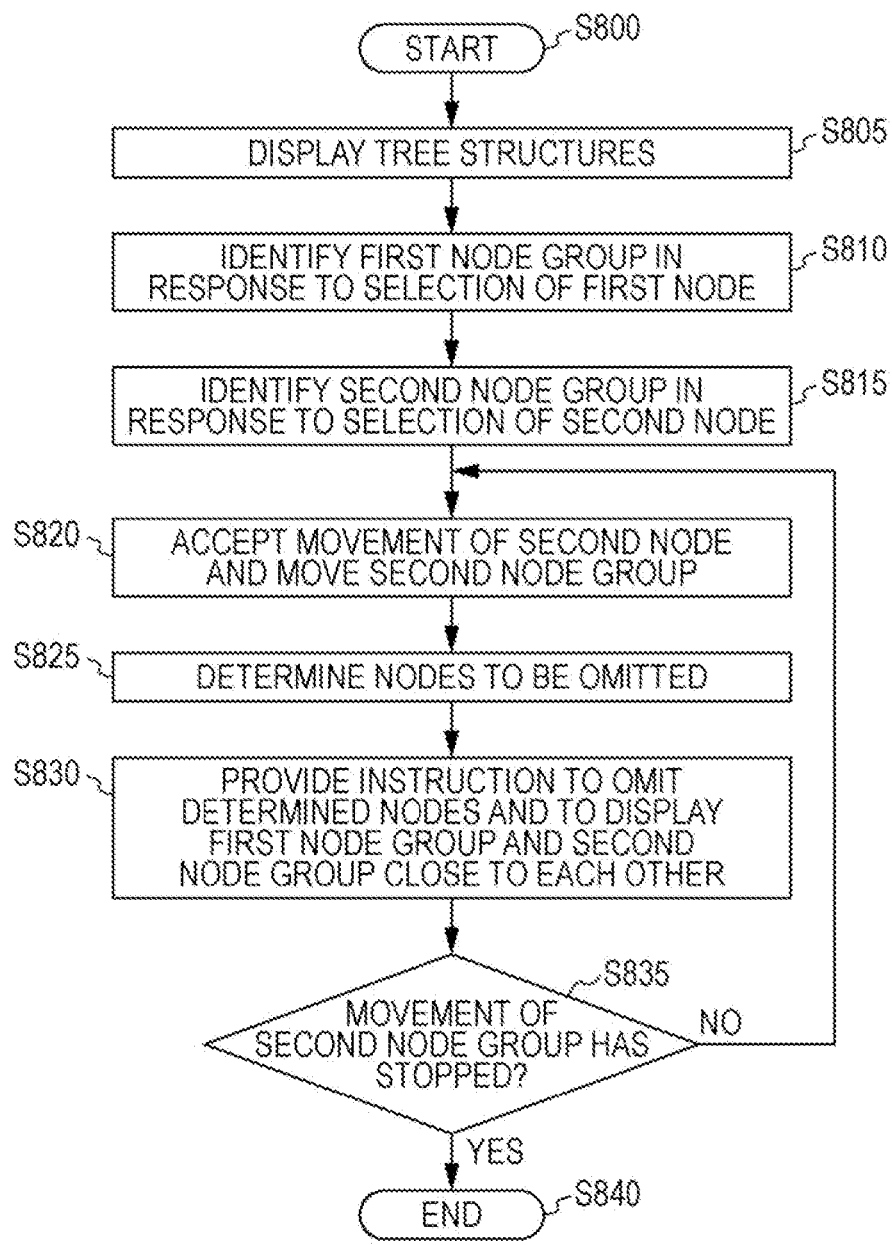
FIG. 8 is a flowchart illustrating a process executed by the data display device illustrated in FIG. 3.

The flow of a process performed by the data display device 100 will be described with reference to FIG. 8. The data display device 100 starts the process in step S800 in accordance with the execution of a program. In step S805, in response to selection of a piece of data of a root node by a user, the display means 200 displays a plurality of piece of data including the piece of data of the root node using a tree structure. When the user wants to refer to pieces of data including "IT device" and "store" as root nodes, the user displays two tree structures in parallel with each other, each including one of "IT device" and "store". Here, description will be given of a case where two tree structures are displayed in parallel, but the present invention is not limited to this. For example, one tree structure may be displayed, or three or more tree structures may be displayed in parallel.

In step S810, in response to user's selection of a piece of data to be referred to in the tree structures, the piece of data serving as a first node, the first identifying means 202 identifies all the nodes connected to the first node in the high-order direction and low-order direction as a first node group.

In step S815, in response to user's selection of another piece of data to be referred to in the tree structures, the other piece of data serving as a second node and being different from the first node group, the second identifying means 204 identifies all the nodes connected to the second node in the high-order direction and low-order direction as a second node group.

In step S820, the movement means 206 accepts an operation of moving the second node toward the first node, and moves the second node group toward the first node in accordance with the operation. In step S825, the determining means 208 determines the nodes whose display is to be omitted along with the movement of the second node group, in accordance with a predetermined rule. Specifically, as in the above-described example, the determining means 208 determines whether or not the distance between a node located between the first node group and the second node group and any of the nodes constituting the second node group has become a certain distance or less, and thereby determining the nodes to be omitted.

In step S830, the instructing means 210 instructs the display means 200 to display the first node group and the second node group close to each other by omitting display of the nodes determined by the determining means 208. In step S835, it is determined whether or not movement of the second node has stopped. If movement has not stopped, the process returns to step S820, movement of the second node group is continued, nodes whose display is to be omitted are determined, and the display is omitted. On the other hand, if movement has stopped, the process proceeds to step S840 and the process ends.

In this way, the process may be ended immediately after movement has stopped. Alternatively, the process may be ended after a certain time period has elapsed. In this case, if movement of the second node is started in a certain time period, the second node group can be moved again.

In the above-described example, display of only unnecessary nodes located between the first node group and the second node group is omitted so that the first node group and the second node group can be displayed close to each other. Additionally, in the above-described rule, a node which is not located between the first node group and the second node group may be defined as a node whose display is to be omitted, so that nodes on the outer side of the first node group and the second node group can be hidden.

Figure 9:
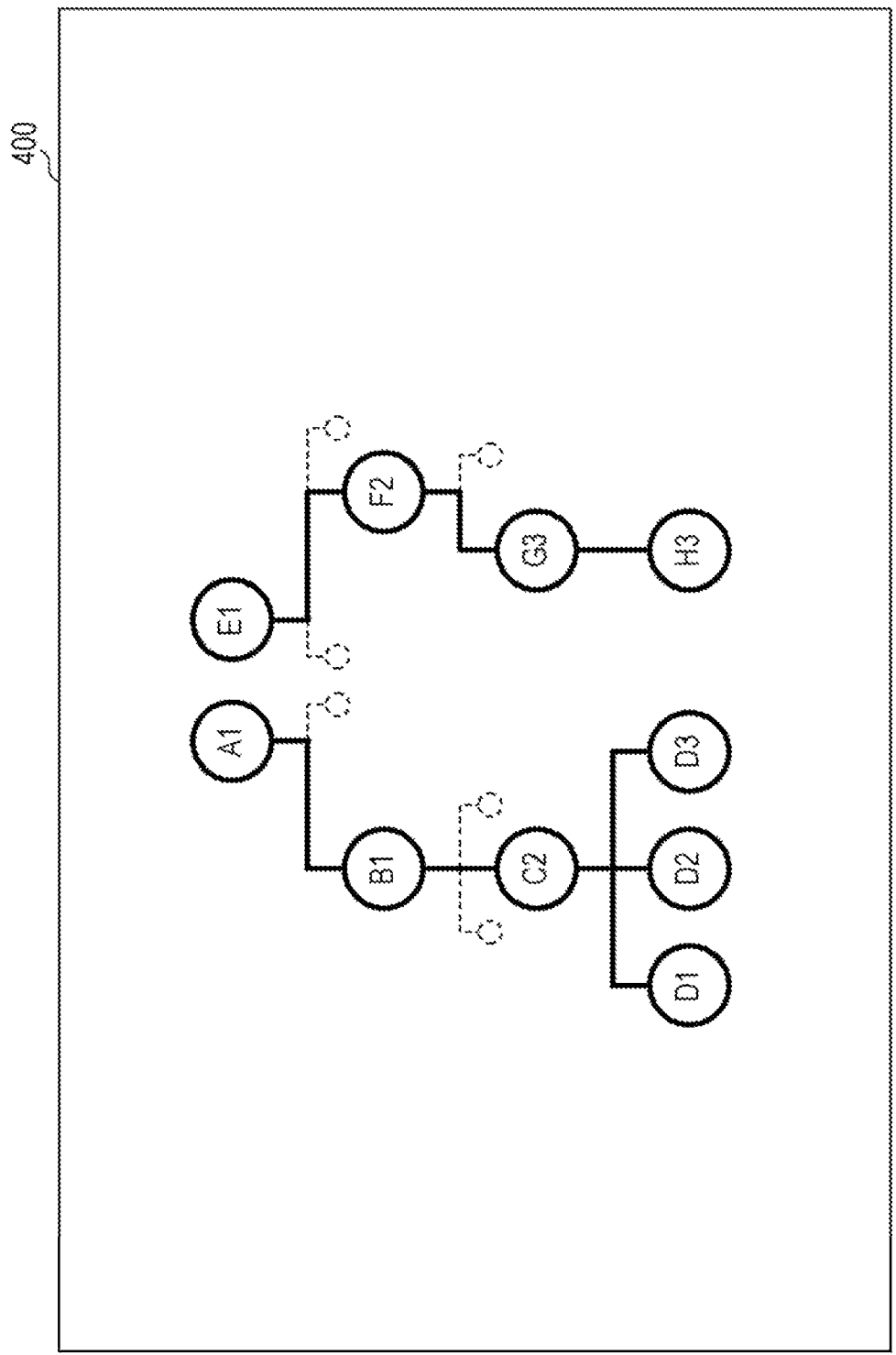
FIG. 9 is a diagram illustrating a state where unnecessary nodes located outside the first node group and the second node group are hidden.

That is, when the nodes on the outer side are hidden, only the first node group and the second node group are displayed, as illustrated in FIG. 9. Also in this case, omitted nodes can be represented by an omission symbol.

When the nodes on the outer side are hidden in this way, two node groups can be displayed in parallel while omitting display of the other nodes. Accordingly, viewability increases, and an operation can be efficiently performed on a target node.

Figure 10:
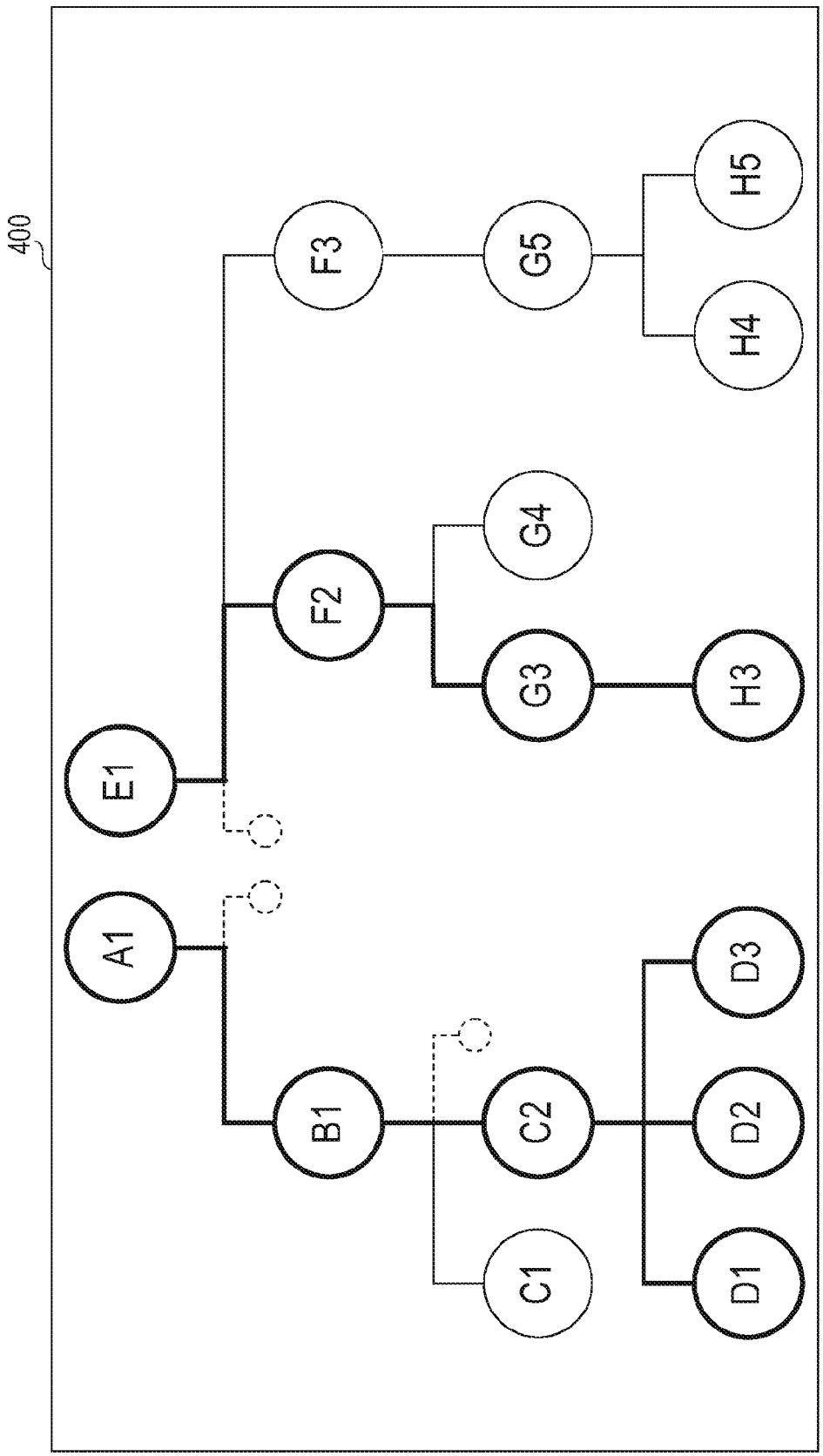
FIG. 10 is a diagram illustrating a state where the first node group and the second node group are displayed close to each other in an enlarged manner within a screen.

The display means 200 displays a tree structure by reducing or omitting the content of pieces of data corresponding to individual nodes. In the case of displaying the first node group and the second node group close to each other, the display means 200 is capable of displaying the first node group and the second node group in an enlarged manner to display the content thereof in an enlarged manner or to display the whole content, as illustrated in FIG. 10. In the display of the whole content, the whole omitted content is displayed.

The display in an enlarged manner can be gradually performed as the second node group becomes closer to the first node. When many nodes are displayed on one screen, characters, figures, or the like expressing the content of data may be too small, or some characters are omitted, and thus it is impossible to read the data. However, the data can be read by performing such display in an enlarged manner or display of the whole content. Accordingly, the user can know the content of data without actually opening the data of a node. When display of the whole content is performed, the size of characters and so forth may be an original size, or may be increased in accordance with the size of frames representing nodes.

Also, a weight value may be associated with each node, and the above-described rule may state that a node located at the certain distance or less and associated with a weight value which is equal to or smaller than a threshold, or an overlapping node associated with a weight value which is equal to or smaller than the threshold is the node whose display is to be omitted. A weight value can be given in accordance with the degree of importance of the piece of data represented by the node. For example, a weight value can be given in accordance with a time when the piece of data was created, the number of users who have used the piece of data, how often the piece of data is updated, and how often the piece of data is referred to. Alternatively, a user may set a degree of importance, and a weight value corresponding to the degree of importance can be given. Alternatively, for example, a degree of importance may be set by selecting any one of "low", "middle", and "high" as a degree of seriousness of failure, and a weight value may be given in accordance with the degree of importance.

In general, the degree of importance of data which is currently being created is higher than that of data created in the past, and the degree of importance of data used by many users is higher than that of data used by a few users. Also, data which is often updated has a higher degree of interest than data which is less often updated, and thus has a higher degree of importance. Data which is referred to many times has a higher degree of interest than data which is referred to a few times, and thus has a higher degree of importance.

A weight value can be given as a certain value, or may be given as the number of updates, the number of references, and the number of uses. The determining means 208 is capable of determining a node to be a node whose display is to be omitted if the node is located at the certain distance or less and is associated with a weight value which is equal to or smaller than a threshold or if the node is overlapped and is associated with a weight value which is equal to or smaller than the threshold. Thus, even if the node is located at the certain distance or less or is overlapped, if the weight value thereof is larger than the threshold, the determining means 208 determines that the node is not to be omitted, and continue display thereof. Accordingly, a node having a high degree of importance can be left without omitted.

Figure 11:
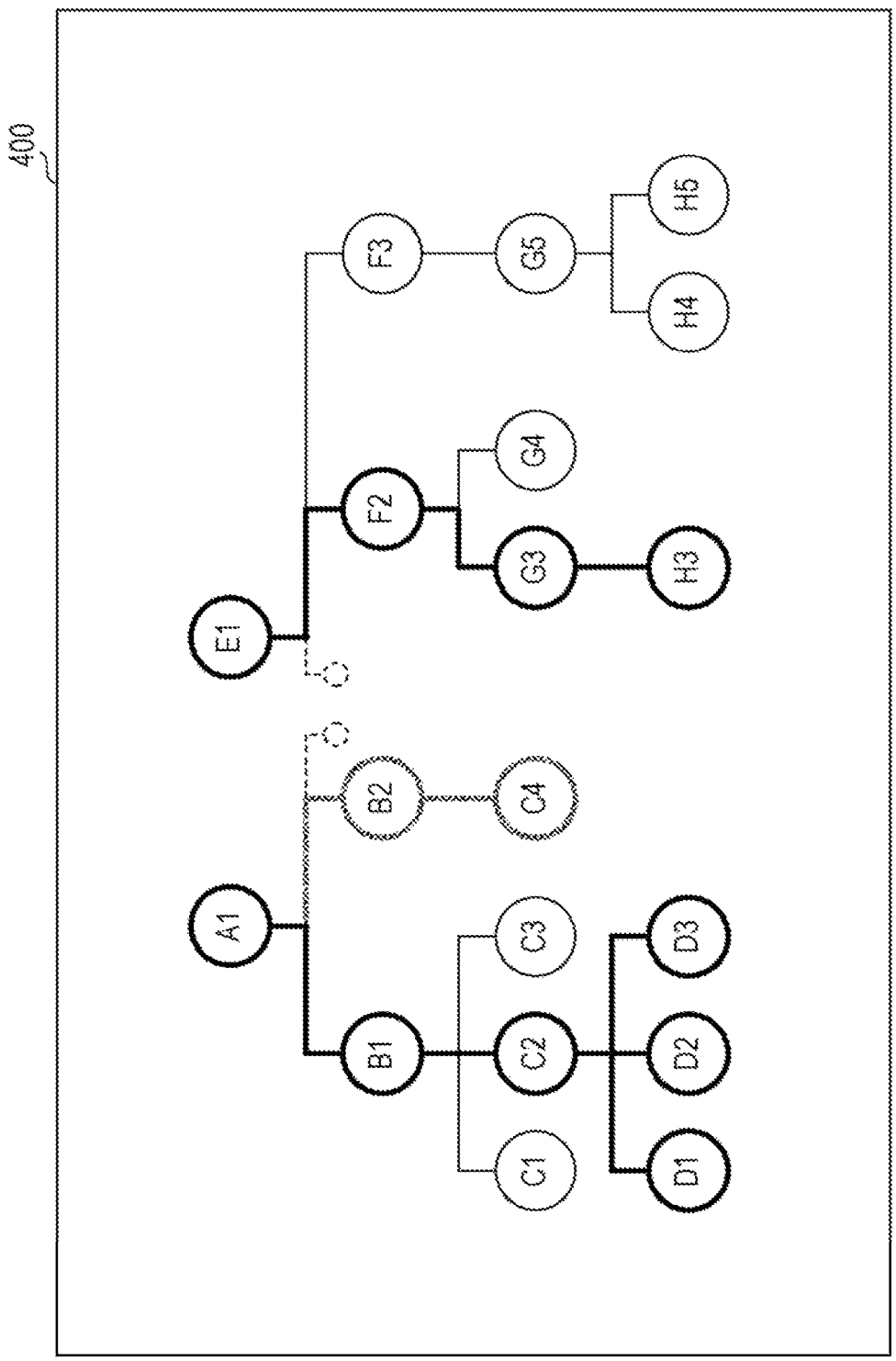
FIG. 11 is a diagram illustrating a state where determination is performed in accordance with a degree of importance and serial nodes having a high degree of importance are left.

FIG. 11 illustrates a state where nodes B2 and C4, whose weight value is determined to be larger than the threshold and whose degree of importance is determined to be high, are kept displayed without being omitted. In FIG. 11, nodes B2 and C4 are displayed with a different color to indicate that the degree of importance thereof is high. The degree of importance may be determined based on something other than the time when the data was created. The threshold may be set to a certain value by the user.

In the above-described embodiment, all the nodes identified as the first node group and the second node group are displayed without being omitted. The instructing means 210 illustrated in FIG. 3 may refer to node display information set by the user and may instruct the display means 200 to hide the nodes whose display is to be omitted among the nodes included in the first node group and the second node group.

The node display information is input by the user and is stored in a storage device, such as the HDD 108. In the case of providing an instruction to display the first node group and the second node group close to each other by omitting display of the nodes determined by the determining means 208, the instructing means 210 refers to the stored node display information to identify the nodes to be hidden in the first node group and the second node group, and instructs the display means 200 to omit display of the identified nodes.

The node display information may be information indicating that all the nodes except the nodes in the same layer as selected nodes, that is, the first node and the second node, are to be hidden. Accordingly, a demand for referring to only data at the vicinity of a target can be satisfied.

Alternatively, the node display information may be information indicating that only root nodes of two selected nodes or only a parent node common to the two selected nodes is to be displayed, and all the other nodes are to be hidden. Alternatively, the node display information may be information indicating that only a specified number of layers above or below a selected node are to be displayed, and the other layers are to be hidden.

Description will be given of the case of selecting node D3 and node H3 illustrated in FIG. 11 and moving node H3 toward node D3. When the layer to be displayed is set to level 1 in the node display information, display of the nodes between the first node group including node D3 and the second node group including node H3 is omitted in the above-described process. Further, the layer of node D3 and node H3, and node C2 and node G3 in the layer immediately above node D3 and node H3 are displayed, and the nodes in the layers thereabove are hidden. When the layer to be displayed is set to level 2, the layer of node D3 and node H3, node C2 and node G3 in the layer immediately thereabove, and node B1 and node F2 in the layer immediately thereabove are displayed, and the nodes in the layers thereabove are hidden. Here, no nodes exist below node D3 and node H3, and thus description has been given regarding the high-order direction. The same is applicable to the low-order direction by using level −1 or the like.

The level may be set in advance through an input operation by the user. Alternatively, the user may open a menu or the like at a certain time and may freely set the level in the menu. Also in this case, nodes may be displayed in an enlarged manner by causing the nodes to be close to each other, and a node with a high degree of importance may be continuously displayed.

The data display device, the data display method, and the computer-readable program product for executing the method according to the present invention have been described in detail with reference to the drawings. The above-described embodiment may be changed without deviating from a range that those skilled in the art can reach, for example, another embodiment may be applied, or addition, change, or deletion may be performed on the above-described embodiment. Any other embodiments are included in the scope of the present invention as long as the operation and effect of the present invention can be realized. Thus, the embodiments disclosed herein are not limited to omission of display of nodes between two node groups, and display of nodes between three or more node groups can be omitted.

The above-described program can be provided by being stored in a recording medium, such as a flexible disk, a CD-ROM, a DVD-ROM, an SD card, or an HDD. Alternatively, the program can be stored in a server or the like connected to a network, such as the Internet, and can be provided via the network in response to a download request.

What is claimed is:

1. A system for displaying a plurality of pieces of data by using a tree structure, comprising:
   a display device;
   a processor coupled to the display device and programmed to initiate executable operations comprising:
   displaying at least one tree structure in which the plurality of pieces of data serve as nodes on the display device;
   identifying, in response to a first node being selected from among the nodes constituting the displayed tree structure, all nodes connected to the first node in a high-order direction and a low-order direction as a first node group;
   identifying, in response to a second node being selected, the second node not being included in the first node group, all nodes connected to the second node in the high-order direction and the low-order direction as a second node group;
   accepting an operation of moving the second node toward the first node and moving the second node group toward the first node in accordance with the operation;
   determining, in accordance with a predetermined rule, a node whose display is to be omitted in accordance with movement of the second node group; and
   instructing the display device to display the first node group and the second node group close to each other by omitting display of the determined node.

2. The system of claim 1, wherein the rule states that a node located at a certain distance or less from any of the nodes constituting the second node group is the node whose display is to be omitted.

3. The system of claim 1, wherein the rule states that a node overlapping any of the nodes constituting the second node group is the node whose display is to be omitted.

4. The system of claim 1, wherein the rule states that a node located at a certain distance or less from any of the nodes constituting the second node group or a node overlapping any of the nodes constituting the second node group is the node whose display is to be omitted, and that a node not located between the first node group and the second node group is the node whose display is to be omitted.

5. The system of claim 1, wherein the display device displays, when displaying the tree structure, content of the individual pieces of data corresponding to the individual nodes by reducing or omitting the content, and displays, when displaying the first node group and the second node group close to each other in response to an instruction provided from the processor, the first node group and the second node group in an enlarged manner to display the content in an enlarged manner or to display the whole content.

6. The system of claim 1, wherein each of the nodes is associated with a weight value, and the rule states that a node located at a certain distance or less from any of the nodes constituting the second node group and associated with the weight value which is equal to or smaller than a threshold, or a node overlapping any of the nodes constituting the second node group and associated with the weight value which is equal to or smaller than the threshold is the node whose display is to be omitted.

7. The system of claim 6, wherein the weight value is given in accordance with a degree of importance determined based on a time when the piece of data was created, the number of users who have used the piece of data, how often the piece of data is updated, and how often the piece of data is referred to, or a degree of importance set by a user.

8. The system of claim 1, wherein the processor refers to node display information set by a user, and instructs the display device to hide a node whose display is to be omitted among the nodes included in the first node group and the second node group.

9. A method, comprising:
   displaying upon a display device at least one tree structure in which the plurality of pieces of data serve as nodes;
   identifying, in response to a first node being selected from among the nodes constituting the displayed tree structure, all nodes connected to the first node in a high-order direction and a low-order direction as a first node group;
   identifying, in response to a second node being selected, the second node not being included in the first node group, all nodes connected to the second node in the high-order direction and the low-order direction as a second node group;
   accepting an operation of moving the second node toward the first node and moving the second node group toward the first node in accordance with the operation;
   determining, using a processor and in accordance with a predetermined rule, a node whose display is to be omitted in accordance with movement of the second node group; and
   instructing the display device to display the first node group and the second node group close to each other by omitting display of the determined node.

10. The method of claim 9, wherein the rule states that a node located at a certain distance or less from any of the nodes constituting the second node group is the node whose display is to be omitted.

11. The method of claim 9, wherein the rule states that a node overlapping any of the nodes constituting the second node group is the node whose display is to be omitted.

12. The method of claim 9, wherein the rule states that a node located at a certain distance or less from any of the nodes constituting the second node group or a node overlapping any of the nodes constituting the second node group is the node whose display is to be omitted, and that a node not located between the first node group and the second node group is the node whose display is to be omitted.

13. The method of claim 9, wherein the displaying upon a display device displays, when displaying the tree structure, content of the individual pieces of data corresponding to the individual nodes by reducing or omitting the content, and wherein the method further comprises:
    when displaying the first node group and the second node group close to each other in response to an instruction, displaying the first node group and the second node group in an enlarged manner to display the content in an enlarged manner or to display the whole content.

14. The method of claim 9, wherein each of the nodes is associated with a weight value, and the rule states that a node located at a certain distance or less from any of the nodes constituting the second node group and associated with the weight value which is equal to or smaller than a threshold, or a node overlapping any of the nodes constituting the second node group and associated with the weight value which is equal to or smaller than the threshold is the node whose display is to be omitted.

15. The method of claim 14, wherein the weight value is given in accordance with a degree of importance determined based on a time when the piece of data was created, the number of users who have used the piece of data, how often the piece of data is updated, and how often the piece of data is referred to, or a degree of importance set by a user.

16. The method of claim 9, wherein instructing comprises referring to node display information set by a user, and instructing the display means to hide a node whose display is to be omitted among the nodes included in the first node group and the second node group.

17. A computer program product for displaying a plurality of pieces of data by using a tree structure, comprising:
    a hardware storage device having program code stored thereon, the program code executable by a processor to perform:
        displaying upon a display device at least one tree structure in which the plurality of pieces of data serve as nodes;
        identifying, using the processor and in response to a first node being selected from among the nodes constituting the displayed tree structure, all nodes connected to the first node in a high-order direction and a low-order direction as a first node group;
        identifying, using the processor and in response to a second node being selected, the second node not being included in the first node group, all nodes connected to the second node in the high-order direction and the low-order direction as a second node group;
        accepting, using the processor, an operation of moving the second node toward the first node and moving the second node group toward the first node in accordance with the operation;
        determining, using the processor and in accordance with a predetermined rule, a node whose display is to be omitted in accordance with movement of the second node group; and
        instructing, using the processor, the display device to display the first node group and the second node group close to each other by omitting display of the determined node.

18. The computer program product of claim 17, wherein the rule states that a node located at a certain distance or less from any of the nodes constituting the second node group is the node whose display is to be omitted.

19. The computer program product of claim 17, wherein the rule states that a node overlapping any of the nodes constituting the second node group is the node whose display is to be omitted.

20. The computer program product of claim 17, wherein the rule states that a node located at a certain distance or less from any of the nodes constituting the second node group or a node overlapping any of the nodes constituting the second node group is the node whose display is to be omitted, and that a node not located between the first node group and the second node group is the node whose display is to be omitted.

\* \* \* \* \*